Patented June 27, 1950

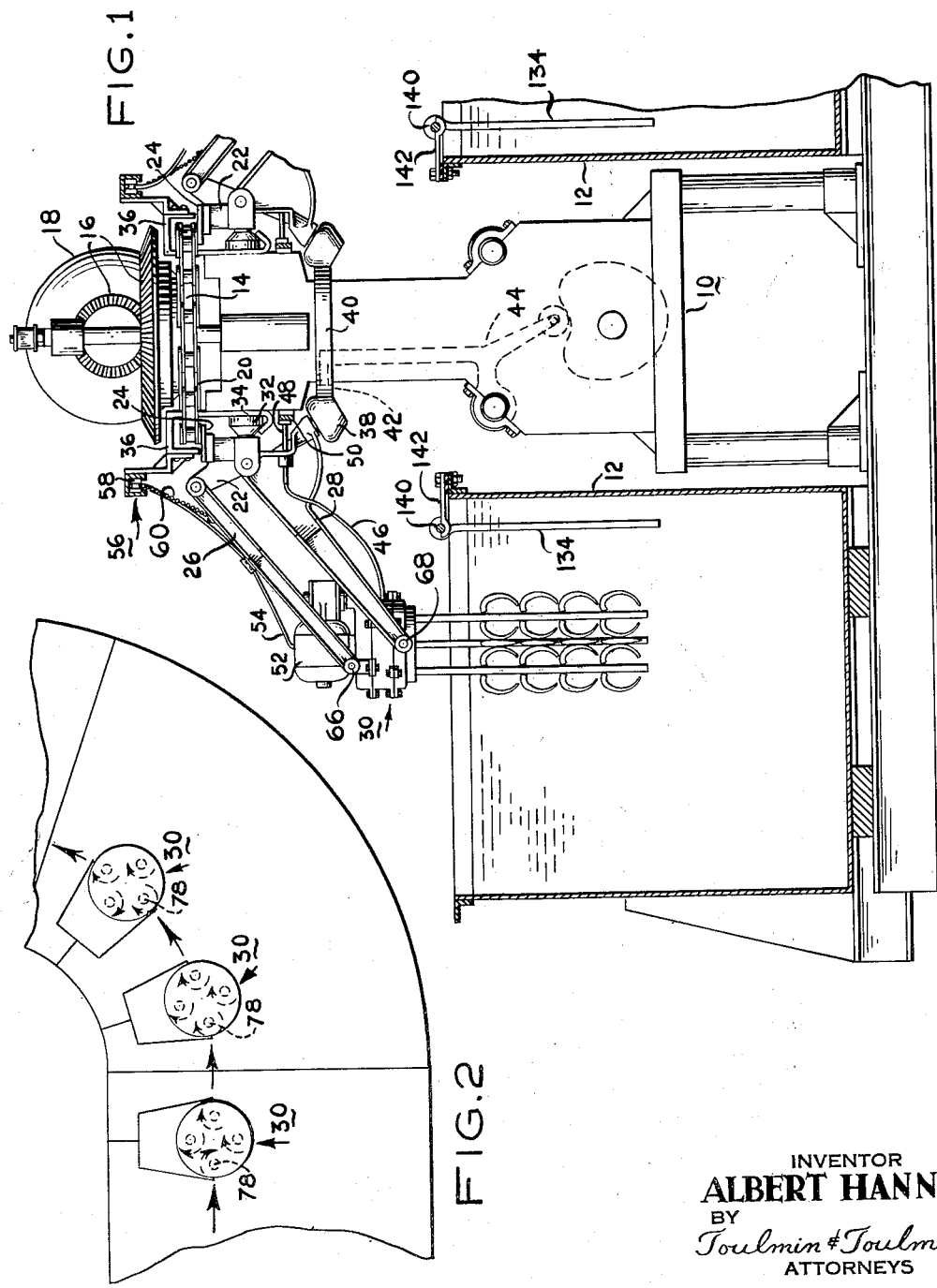

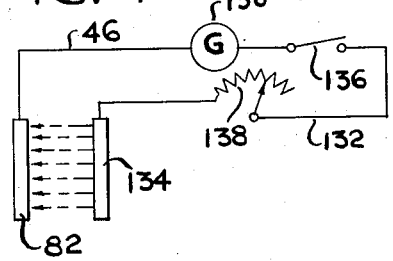
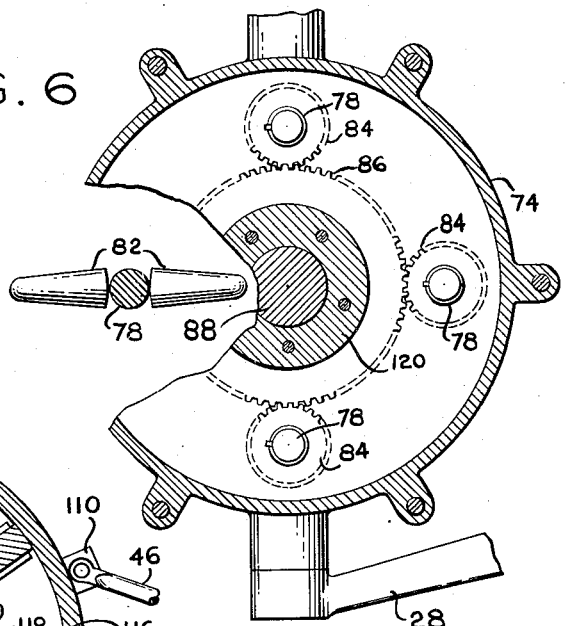
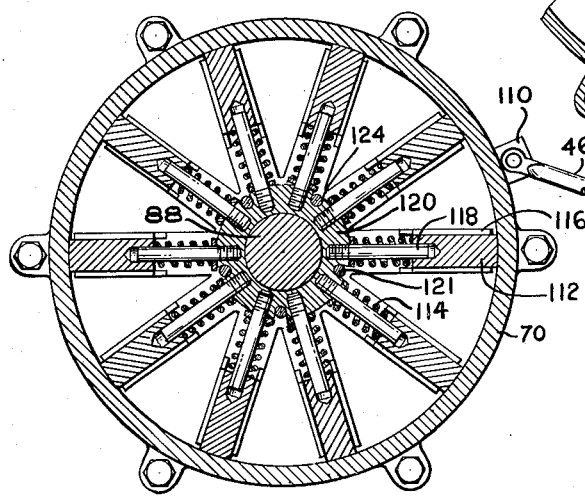
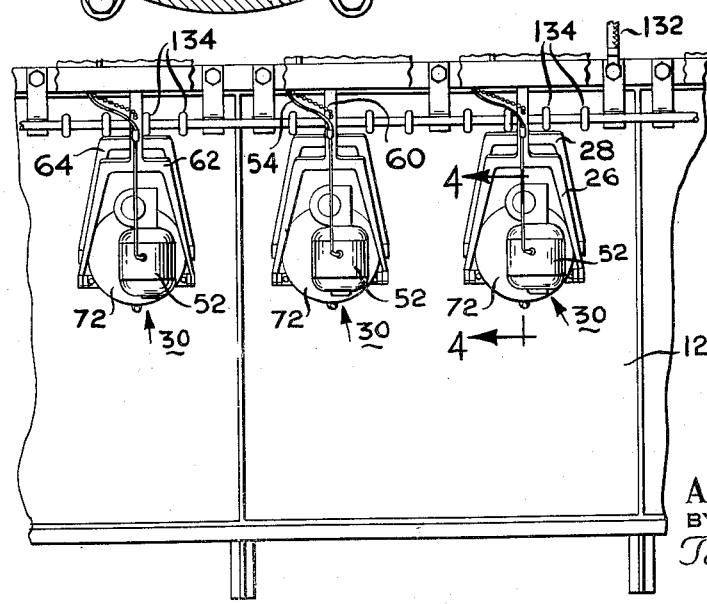

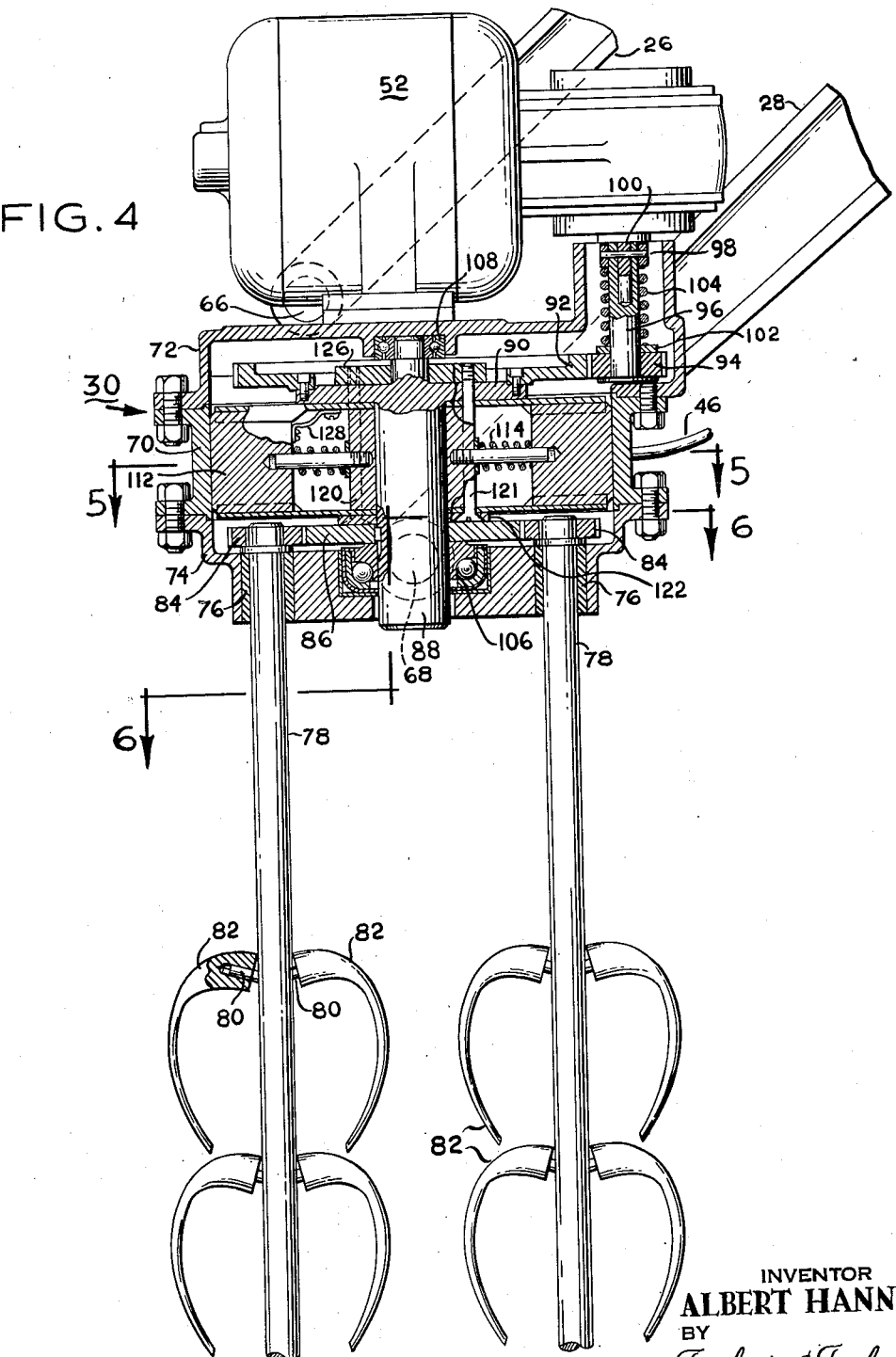

2,512,642

UNITED STATES PATENT OFFICE 2,512,642

APPARATUS FOR ELECTROPROCESSING WORKPIECES

Albert Hannon, Springfield, Ohio

Application June 29, 1946, Serial No. 680,488

2 Claims. (Cl. 204—199)

This invention relates to method and apparatus for processing workpieces, and particularly to such methods and apparatus as applied to a process involving liquid baths of various natures.

In the processing of workpieces through electro-deposition work cycles, there are normally a series of steps during which the workpiece is prepared for plating, is then plated, and finally is washed clean. These steps are usually carried out by arranging a series of tanks or reservoirs and passing the workpiece therethrough by a suitable conveying means which lifts the workpieces from tank to tank while transporting them therethrough.

Many of the steps in a process of this type are characterized by an evolution of gas at the surface of the workpiece which often provides a barrier that prevents the bath from reaching the surface of the work member and thus detracts from the efficiency of the work cycle. The work cycle can be made more rapid and workpieces of better quality produced if the gaseous film which forms on the said work-piece is continuously removed.

The primary object of the present invention is to provide a conveying means for workpieces for a work process as set forth above which maintains the surface of the workpieces substantially free of gaseous deposits.

Another object is to provide a simple workpiece carrying means for processing equipment such as electro-plating machines which develops a more rapid work cycle and an improved product.

Still another object is to provide a work supporting device which will continuously move the workpieces while in the various baths of a process thereby to keep the surfaces of the workpieces free of gas, and to agitate the solution.

Another object is to provide a workpiece supporting and rotating mechanism for electro-processing equipment which is adapted for being secured directly to standard machine.

It is also an object to provide a workpiece supporting and rotating mechanism for an electro-processing machine in which there is an amply large electrically conductive path to the workpiece for all electro-processing operations.

These and other objects and advantages become more apparent upon reference to the following specification taken together with the accompanying drawings in which:

Figure 1 is an end view, partly in section, showing an electro-processing machine having a workpiece supporting mechanism according to this invention;

Figure 2 is a diagrammatic plan view showing the movement of the workpieces as they are transported through the machine;

Figure 3 is a plan view showing the physical arrangement of the workpiece supporting mechanisms and the solution holding tanks;

Figure 4 is an enlarged vertical section through the workpiece supporting mechanism and is indicated by the line 4—4 on Figure 3;

Figure 5 is a plan section indicated by the line 5—5 on Figure 4;

Figure 6 is a plan section indicated by the line 6—6 on Figure 4; and

Figure 7 is the electrical circuit used on the machine.

Referring to the drawings, 10 indicates the frame of an electro-processing machine adapted for employing the mechanism, and for carrying out the methods of this invention. At either side of the frame 10 are the solution holding tanks 12 which are preferably arranged in an oval path around the said frame. The frame 10 extends upwardly between the tanks and has journaled at either end a sprocket, one of which is indicated at 14 in Figure 1. One of these sprockets is driven as by the gearing 16 from a source of power 18 and around the said sprockets there passes a chain 20. At spaced intervals along the chain 20 there are brackets as indicated at 22 which are secured to the said chain as by the strap members 24. Pivoted to each of the brackets 22 is an upper arm 26 and a lower arm 28 which extend outwardly and over the solution tanks 12. Between the outer ends of the arms 26 and 28 there is pivotally supported the work supporting fixture of this invention generally indicated at 30.

The brackets 22 carry the rollers 32 which ride in a track member 34 which is operable to support the weight of the bracket and the members carried thereby. The brackets 22 are further supported in order to prevent their tilting outwardly at the top along the straight reaches of the chain 20 by the channels 36 which are preferably integrally formed with the channels 34.

The angular position of the arms 26 and 28 is determined by the rollers 38 which are carried on the lower arms 28 and which ride on a rail 40 carried on the frame 10. The rail 40 is discontinuous and has inserted therein between each adjacent pair of tanks a movable section 42 which is actuatable outwardly toward the said tanks by the arms and shaft indicated at 44. The arrangement at 44 is such that the arm 28 is lifted about its pivotal connection with the bracket 22 thereby to lift the work supporting fixture to such a height that the workpieces can be transported over the ends of the tanks.

Electrical connection is made with the workpieces through their supporting fixture by a cable 46 which leads to a shoe or brush 48 carried by the arm 28 and which engages an energized rail 50 suitably located on the machine frame 10.

As will become apparent hereinafter, the work supporting fixture 30 comprises a motor 52 which is operable continuously to rotate the workpieces in order to maintain them free from gaseous films and to agitate the solution through which they pass. Electrical energy is conducted to the motors 52 by the cables 54 which lead to a trolley system 56 of any well known construction and which includes a follower member 58 connected by the chain 60 with the arm 26 so that the said follower follows the workpiece supporting unit around the machine.

Referring to Figures 3 and 4, it will become apparent that the arms 26 and 28 are bifurcated as at 62 and 64 respectively and that they are pivotally connected as at 66 and 68 respectively with the frame of the workpiece supporting mechanism 30. The pivots 66 and 68 have the same spacing and are parallel with the pivotal connections of the arms 26 and 28 with the bracket 22 so that the lifting of the said arms to elevate the workpiece holding fixture will maintain the said fixture in parallelism with its original position at all times.

Referring now more particularly to Figures 4, 5 and 6, the workpiece holding fixture will be seen to comprise a unit consisting of a central housing portion 70 which carries an upper end cover 72 and lower end cover 74. The lower end cover 74 has a plurality of circumferentially spaced bearings 76 therein through which pass the vertical shafts 78. The shafts 78 extend downwardly from the said end cover and comprise a plurality of workpiece receiving portions 80 on which are placed the workpieces 82 to be processed. In the drawings these workpieces are illustrated as automobile door-handles but will be understood that workpieces of any nature could be carried by the shafts 78.

Each shaft 78 has keyed thereto within the end cover 74 a pinion 84 which meshes with a central gear 86 keyed to the shaft 88 which extends upwardly and into the upper end cover 72.

Within the upper end cover 72, the shaft 88 is flanged as at 90 and has secured thereto the ring gear 92 which is continuously in mesh with the pinion 94. The pinion 94 is mounted on but not keyed to the shaft 96 which is pinned as at 98 to the reduced speed output shaft 100 of the motor 52.

For driving the gear 94 by the shaft 96, there is a friction plate 102 which is urged by the spring 104 into frictional engagement with the said gear. This provides for a friction clutch by means of which the driving connection between the motor and the workpiece supporting shafts 78 is interrupted when a predetermined load is placed on the said shafts. The shaft 88 is suitably supported and guided in rotation as by the thrust bearing 106 in the lower cover plate 74 and the anti-friction bearing 108 in the upper cover plate 72.

For supplying electrical energy to the workpieces 82, the aforementioned cable 46 is connected with the housing portion 70 as at 110. Then, in order to make good connection between the said housing and the shafts 78, there are provided a plurality of brushes 112 which are continuously urged into engagement with the inside surface of the housing by the springs 114. The brushes are guided in their reciprocation by upper and lower spider members 116 which form brush pockets and which are arranged to rotate in unison with the shaft 88.

The brushes are further guided, and the springs 114 are supported, by the pins or studs 118 which extend into bores in the brushes and which are threaded into a block 120 to extend radially outward therefrom. The block 120 rests between the spiders 116 to provide proper spacing therefor and is retained in proper position relative to the shaft 88 by the screws 121 which pass upwardly through the plate 122, the notches 124 in the block 120, the flange 90 of the shaft 88, and into the plate 126. By tightening the screws 121, the entire unit comprising shaft 88, block 120 and the brush ring spiders 116 are made integral.

To provide an adequate flow path for the current collected by the brushes 112, there are the leads 128 which are connected between the said brushes and the flange 90 of the shaft 88. The shaft 88 and other parts of the mechanism may be manufactured from material having a high electrical conductivity such as aluminum or bronze if desired.

To complete the electric circuit reference is had to Figure 7 wherein it is shown that cable 46 is connected to one side of generator 130 the other side of which is connected by line 132 to the anode rods 134. Line 132 contains switch 136 and adjustable resistance 138.

Anode rods 134 are suspended from the bar 140, which in turn is supported from the side of the tank by insulated brackets 142.

Reference to Figure 2 will clarify the operation of the work supporting mechanism. As the machine operates and carries the work supporting mechanisms 30 through the baths, the shafts 78 are continuously rotated as indicated by the arrows in Figure 2 so that gas generated on the surfaces of the workpieces is washed away, the solution is agitated, and a rapid and efficient work cycle results.

It will be understood that this invention is susceptible to modification in order to adapt it to different usages and conditions and, accordingly, it is desired to comprehend such modifications within this invention as may fall within the scope of the appended claims.

I claim:

1. In a workpiece supporting fixture adapted for use in connection with automatic electroprocessing machines; a hollow frame; a plurality of workpiece supporting members extending downwardly from said frame; a central shaft in said frame; gearing connecting said central shaft with said members whereby rotation of said shaft drives said members; means for driving said central shaft; and means for effecting electrical communication between said frame and said central shaft comprising; a block surrounding said shaft and keyed thereto; a brush ring comprising upper and lower spiders and clamped to said block and shaft; a plurality of brushes radially movable in said spiders to engage the inside surface of said frame; yielding means continuously urging said brushes toward said frame; and wires individually connecting said brushes directly with said central shaft, said brushes, block, shaft, gearing, members and frame all being electrically conductive and said frame having means for connecting an electrically conductive cable thereto.

2. In a workpiece supporting fixture adapted for use in connection with automatic electro-processing machines; a hollow frame; a central shaft journalled in said frame, said shaft and frame being electrically conductive; means for effecting electrical communication between said frame and shaft comprising a plurality of radially extending current collecting brushes riding on the inside surface of said frame; an electrically conductive brush ring comprising upper and lower spiders guiding said brushes; an electrically conductive block on said shaft; means clamping said spiders to said block and said block to said shaft; yielding means continuously urging said brushes toward said frame; means for driving said shaft in rotation; and a plurality of workpiece supporting members extending downwardly from said frame to receive workpieces, and gearing connecting said workpiece supporting member to said central shaft to rotate in unison therewith, said workpiece supporting members and said gearing being electrically conductive, and said housing including means on the outside thereof for connection with a wire for conducting electric current to said housing.

ALBERT HANNON.

REFERENCES CITED

The following references are of record in the file of this patent:

UNITED STATES PATENTS

| Number | Name | Date |
| --- | --- | --- |
| 1,280,249 | Landry | Oct. 1, 1918 |
| 1,315,785 | Lutz | Sept. 9, 1919 |
| 1,778,628 | Eckman | Oct. 14, 1930 |
| 1,956,625 | Ritter | May 1, 1934 |
| 2,272,609 | Kennedy | Feb. 10, 1942 |
| 2,341,157 | Nachtman | Feb. 8, 1944 |
| 2,341,606 | Finston | Feb. 16, 1944 |

FOREIGN PATENTS

| Number | Country | Date |
| --- | --- | --- |
| 483,495 | Great Britain | Apr. 21, 1938 |